(12) United States Patent
Fujii et al.

(10) Patent No.: US 9,631,128 B2
(45) Date of Patent: Apr. 25, 2017

(54) BONDING MATERIAL AND SEMICONDUCTOR SUPPORTING DEVICE

(75) Inventors: Tomoyuki Fujii, Nagoya (JP); Akio Suzuki, Annaka (JP)

(73) Assignees: NGK Insulators, Ltd., Nagoya (JP); Shin-Etsu Chemical Co., Ltd., Chiyoda-Ku (JP)

( * ) Notice: Subject to any disclaimer, the term of this patent is extended or adjusted under 35 U.S.C. 154(b) by 1738 days.

(21) Appl. No.: 12/025,903

(22) Filed: Feb. 5, 2008

(65) Prior Publication Data

US 2008/0193741 A1    Aug. 14, 2008

(30) Foreign Application Priority Data

Feb. 9, 2007 (JP) .................................. 2007-030530
Feb. 4, 2008 (JP) .................................. 2008-024050

(51) Int. Cl.
| B32B 7/12 | (2006.01) |
| C09J 183/04 | (2006.01) |
| C08G 77/12 | (2006.01) |
| C08G 77/20 | (2006.01) |
| C08K 3/22 | (2006.01) |
| C08L 83/04 | (2006.01) |

(52) U.S. Cl.
CPC ............ *C09J 183/04* (2013.01); *C08G 77/12* (2013.01); *C08G 77/20* (2013.01); *C08K 3/22* (2013.01); *C08L 83/04* (2013.01); *Y10T 428/257* (2015.01); *Y10T 428/2804* (2015.01); *Y10T 428/2813* (2015.01)

(58) Field of Classification Search
USPC .................. 428/329, 344, 346, 447; 156/329
See application file for complete search history.

(56) References Cited

U.S. PATENT DOCUMENTS

| 5,021,494 A * | 6/1991 | Toya ............................. 524/404 |
| 6,256,187 B1 * | 7/2001 | Matsunaga et al. .......... 361/234 |
| 6,433,057 B1 * | 8/2002 | Bhagwagar et al. .......... 524/403 |

(Continued)

FOREIGN PATENT DOCUMENTS

| JP | 03-003249 A1 | 1/1991 |
| JP | 04-287344 A1 | 10/1992 |

(Continued)

OTHER PUBLICATIONS

JP 2002231797 A (Aug. 2002) Machine Translation.*

*Primary Examiner* — Kenneth Stachel
(74) *Attorney, Agent, or Firm* — Burr & Brown, PLLC (57) ABSTRACT

The bonding material is formed of a cured sheet composed of an addition curable silicone adhesive agent, and the addition curable silicone adhesive agent contains an organopolysiloxane containing two or more vinyl groups per molecule; an organopolysiloxane resin containing a unit (hereinafter, "M") represented by $R_3SiO_{1/2}$ (R is a monovalent hydrocarbon group having 1 to 6 carbon atoms and containing no aliphatic unsaturated bond) and a unit (hereinafter, "Q") represented by $SiO_{4/2}$ in a molar ratio (M/Q ratio) equal to or more than 0.6 to equal to or less than 0.6 to 1.6; an organohydrogenpolysiloxane containing a silicon atom-bonding hydrogen atom; a platinum catalyst; and a heat conductive filler whose content falls within the range equal to or more than 20 vol % to equal to or less than to 50 vol %.

4 Claims, 4 Drawing Sheets

(56) References Cited

U.S. PATENT DOCUMENTS

| | | |
|---|---|---|
| 6,519,152 B1 * | 2/2003 | Birger .......................... 361/704 |
| 7,019,956 B2 | 3/2006 | Fujii et al. |
| 2004/0242762 A1 | 12/2004 | Horikoshi et al. |
| 2006/0120011 A1 * | 6/2006 | Handa et al. ................. 361/234 |
| 2007/0217117 A1 | 9/2007 | Ohta et al. |
| 2009/0014056 A1 * | 1/2009 | Hockaday .................... 136/247 |

FOREIGN PATENT DOCUMENTS

| | | |
|---|---|---|
| JP | 10-270540 A | 10/1998 |
| JP | 2002-231797 A1 | 8/2002 |
| JP | 2003-183576 | 7/2003 |
| JP | 2004-99842 | 4/2004 |
| JP | 2004-352947 | 12/2004 |
| JP | 2006-287210 A | 10/2006 |
| TW | 1250198 | 3/2006 |

\* cited by examiner

| | Material for adhesive agent | Material for filler | Content of filler (vol%) | Average particle size of filler | | Mixing ratio of fine particles/ Coarse particles | Primer coating | M/Q ratio | Shearing separation strength (MPa) | | | Elongation | |
|---|---|---|---|---|---|---|---|---|---|---|---|---|---|
| | | | | Fine particles | Coarse particles | | | | Room temperature | 150°C | | Room temperature | 150°C |
| Desired value | | | | | | | | | >0.5 | >0.2 | | >0.04 | >0.04 |
| Ex. 1 | Silicone | Alumina | 20 | 0.7 | 20 | 10:90 | Absent | 1.1 | 0.79 | 0.23 | | 0.048 | 0.044 |
| Ex. 2 | Silicone | Alumina | 20 | 0.7 | 20 | 10:90 | Present | 1.1 | 0.83 | 0.33 | | 0.046 | 0.045 |
| Ex. 3 | Silicone | Alumina | 20 | 0.7 | 20 | 30:70 | Absent | 1.1 | 0.78 | 0.23 | | 0.047 | 0.044 |
| Ex. 4 | Silicone | Alumina | 20 | 0.7 | 20 | 20:80 | Absent | 1.1 | 0.82 | 0.26 | | 0.050 | 0.048 |
| Ex. 5 | Silicone | Alumina | 33 | 0.7 | 20 | 10:90 | Absent | 1.1 | 0.80 | 0.24 | | 0.049 | 0.045 |
| Ex. 6 | Silicone | Alumina | 33 | 0.7 | 20 | 20:80 | Absent | 1.1 | 0.78 | 0.24 | | 0.058 | 0.045 |
| Ex. 7 | Silicone | Alumina | 33 | 0.7 | 20 | 20:80 | Present | 1.1 | 0.85 | 0.35 | | 0.062 | 0.048 |
| Ex. 8 | Silicone | Alumina | 33 | 0.7 | 20 | 20:80 | Absent | 1.5 | 0.76 | 0.25 | | 0.068 | 0.047 |
| Ex. 9 | Silicone | Alumina | 33 | 0.7 | 20 | 20:80 | Present | 1.5 | 0.84 | 0.32 | | 0.065 | 0.052 |
| Ex. 10 | Silicone | Alumina | 33 | 0.7 | 20 | 20:80 | Present | 0.6 | 0.84 | 0.32 | | 0.065 | 0.052 |
| Ex. 11 | Silicone | Alumina | 33 | 0.7 | 10 | 20:80 | Present | 1.1 | 0.85 | 0.34 | | 0.064 | 0.047 |
| Ex. 12 | Silicone | Alumina | 33 | 0.7 | 30 | 20:80 | Present | 1.1 | 0.86 | 0.33 | | 0.065 | 0.047 |
| Ex. 13 | Silicone | Alumina | 50 | 0.7 | 20 | 20:80 | Present | 1.1 | 0.75 | 0.28 | | 0.046 | 0.044 |
| Ex. 14 | Silicone | AlN | 33 | 0.7 | 20 | 20:80 | Present | 1.1 | 0.83 | 0.33 | | 0.062 | 0.049 |
| Ex. 15 | Silicone | SiC | 33 | 0.7 | 20 | 20:80 | Present | 1.1 | 0.83 | 0.34 | | 0.065 | 0.051 |
| Com. Ex. 1 | Acryl | Alumina | 30 | — | 10 | 0:100 | Absent | — | 0.62 | 0.10 | | 0.040 | 0.028 |
| Com. Ex. 2 | Silicone | Alumina | 33 | 0.7 | 20 | 20:80 | Absent | 0.4 | 0.35 | 0.15 | | 0.025 | 0.015 |
| Com. Ex. 3 | Silicone | Alumina | 33 | 0.7 | 20 | 20:80 | Absent | 1.7 | 0.25 | 0.05 | | 0.035 | 0.072 |
| Com. Ex. 4 | Silicone | Alumina | 60 | 0.7 | 20 | 20:80 | Absent | 1.1 | 0.20 | 0.08 | | 0.044 | 0.025 |
| Com. Ex. 5 | Silicone | Alumina | 33 | 0.7 | 20 | 5:95 | Present | 1.1 | 0.30 | 0.10 | | 0.042 | 0.035 |
| Com. Ex. 6 | Silicone | Alumina | 33 | 0.7 | 40 | 20:80 | Present | 1.1 | 0.32 | 0.11 | | 0.044 | 0.035 |
| Com. Ex. 7 | Silicone | AlN | 60 | 0.7 | 20 | 20:80 | Present | 1.1 | 0.18 | 0.06 | | 0.041 | 0.025 |
| Com. Ex. 8 | Silicone | SiC | 60 | 0.7 | 20 | 20:80 | Present | 1.1 | 0.21 | 0.07 | | 0.043 | 0.025 |

FIG. 4

| | Material for adhesive agent | Material for filler | Content of filler (vol%) | Average particle size of filler | | Mixing ratio of fine particles/ Coarse particles | Primer coating | M/Q ratio | Heat conductivity (λ) of bonding material layer (W/mk) | |
|---|---|---|---|---|---|---|---|---|---|---|
| | | | | Fine particles | Coarse particles | | | | Before endurance test | After endurance test |
| Desired value | | | | | | | | | >0.30 | >0.30 |
| Ex. 1 | Silicone | Alumina | 20 | 0.7 | 20 | 10:90 | Absent | 1.1 | 0.32 | 0.31 |
| Ex. 5 | Silicone | Alumina | 33 | 0.7 | 20 | 10:90 | Absent | 1.1 | 0.55 | 0.55 |
| Ex. 6 | Silicone | Alumina | 33 | 0.7 | 20 | 20:80 | Absent | 1.1 | 0.54 | 0.53 |
| Ex. 7 | Silicone | Alumina | 33 | 0.7 | 20 | 20:80 | Present | 1.1 | 0.53 | 0.57 |
| Ex. 8 | Silicone | Alumina | 33 | 0.7 | 20 | 20:80 | Absent | 1.5 | 0.58 | 0.57 |
| Ex. 9 | Silicone | Alumina | 33 | 0.7 | 20 | 20:80 | Present | 1.5 | 0.55 | 0.57 |
| Ex. 11 | Silicone | Alumina | 33 | 0.7 | 10 | 20:80 | Present | 1.1 | 0.55 | 0.55 |
| Ex. 12 | Silicone | Alumina | 33 | 0.7 | 30 | 20:80 | Present | 1.1 | 0.54 | 0.55 |
| Ex. 13 | Silicone | Alumina | 50 | 0.7 | 20 | 20:80 | Present | 1.1 | 0.62 | 0.64 |
| Ex. 14 | Silicone | AlN | 33 | 0.7 | 20 | 20:80 | Present | 1.1 | 0.65 | 0.64 |
| Ex. 15 | Silicone | SiC | 33 | 0.7 | 20 | 20:80 | Present | 1.1 | 0.60 | 0.62 |
| Com. Ex. 1 | Acryl | Alumina | 30 | — | 10 | 0:100 | Absent | — | 1.10 | 0.20 |
| Com. Ex. 2 | Silicone | Alumina | 33 | 0.7 | 20 | 20:80 | Absent | 0.4 | 0.40 | 0.25 |
| Com. Ex. 3 | Silicone | Alumina | 33 | 0.7 | 20 | 20:80 | Absent | 1.7 | 0.45 | 0.30 |
| Com. Ex. 4 | Silicone | Alumina | 60 | 0.7 | 20 | 20:80 | Absent | 1.1 | 0.22 | 0.24 |
| Com. Ex. 7 | Silicone | AlN | 60 | 0.7 | 20 | 20:80 | Present | 1.1 | 0.23 | 0.22 |
| Com. Ex. 8 | Silicone | SiC | 60 | 0.7 | 20 | 20:80 | Present | 1.1 | 0.20 | 0.22 |
| Com. Ex. 9 | Silicone | Alumina | 15 | 0.7 | 20 | 20:80 | Present | 1.1 | 0.25 | 0.23 |
| Com. Ex. 10 | Silicone | AlN | 15 | 0.7 | 20 | 20:80 | Present | 1.1 | 0.20 | 0.18 |
| Com. Ex. 11 | Silicone | SiC | 15 | 0.7 | 20 | 20:80 | Present | 1.1 | 0.24 | 0.22 |

FIG. 5

| | Material for adhesive agent | Material for filler | Content of filler (vol%) | Average particle size of filler - Fine particles | Average particle size of filler - Coarse particles | Mixing ratio of fine particles/Coarse particles | Primer coating | M/Q ratio | He gas-leakage amount at the bonded interface (Pam3/s) - After joining | He gas-leakage amount at the bonded interface (Pam3/s) - After endurance test |
|---|---|---|---|---|---|---|---|---|---|---|
| Desired value | | | | | | | | | <1E-09 | <1E-09 |
| Ex. 1 | Silicone | Alumina | 20 | 0.7 | 20 | 10:90 | Absent | 1.1 | 2.0E-10 | 3.1E-10 |
| Ex. 5 | Silicone | Alumina | 33 | 0.7 | 20 | 10:90 | Absent | 1.1 | 3.5E-10 | 3.3E-10 |
| Ex. 6 | Silicone | Alumina | 33 | 0.7 | 20 | 20:80 | Absent | 1.1 | 2.5E-10 | 4.6E-10 |
| Ex. 7 | Silicone | Alumina | 33 | 0.7 | 20 | 20:80 | Present | 1.1 | 4.2E-10 | 3.2E-10 |
| Ex. 8 | Silicone | Alumina | 33 | 0.7 | 20 | 20:80 | Absent | 1.5 | 2.8E-10 | 2.2E-10 |
| Ex. 9 | Silicone | Alumina | 33 | 0.7 | 20 | 20:80 | Present | 1.5 | 3.1E-10 | 3.5E-10 |
| Ex. 13 | Silicone | Alumina | 50 | 0.7 | 20 | 20:80 | Present | 1.1 | 3.1E-10 | 3.3E-10 |
| Ex. 14 | Silicone | AlN | 33 | 0.7 | 20 | 20:80 | Present | 1.1 | 3.8E-10 | 3.4E-10 |
| Ex. 15 | Silicone | SiC | 33 | 0.7 | 20 | 20:80 | Present | 1.1 | 3.9E-10 | 4.2E-10 |
| Com. Ex. 1 | Acryl | Alumina | 30 | — | 10 | 0:100 | Absent | — | 3.4E-10 | 1.5E-07 |
| Com. Ex. 2 | Silicone | Alumina | 33 | 0.7 | 20 | 20:80 | Absent | 0.4 | 2.5E-07 | 3.0E-08 |
| Com. Ex. 3 | Silicone | Alumina | 33 | 0.7 | 20 | 20:80 | Absent | 1.7 | 6.4E-07 | — |
| Com. Ex. 4 | Silicone | Alumina | 60 | 0.7 | 20 | 20:80 | Absent | 1.1 | 7.0E-06 | — |

BONDING MATERIAL AND SEMICONDUCTOR SUPPORTING DEVICE

CROSS REFERENCE TO RELATED APPLICATION

This application is based upon and claims the benefit of priority from a Japanese Patent Application No. TOKUGAN 2007-30530, filed on Feb. 9, 2007 and a Japanese Patent Application No. TOKUGAN 2008-24050, filed on Feb. 4, 2008; the entire contents of which are incorporated herein by reference.

BACKGROUND OF THE INVENTION

1. Field of the Invention

The present invention relates to a bonding material that joins a susceptor for a semiconductor manufacturing device, such as an electrostatic chuck or an electrostatic chuck equipped with a heater, to a cooling board, and also relates to a semiconductor supporting device having a susceptor for a semiconductor manufacturing device and a cooling board joined with the bonding material.

2. Description of the Related Art

Conventionally, liquid silicone rubber, a metal layer containing indium (In), or an organic adhesive agent such as an acrylic adhesive agent or an epoxylic adhesive agent is used for joining a susceptor for a semiconductor manufacturing device to a cooling board which controls the temperature of a Si wafer to be held on the susceptor (see Japanese Patent Application Laid-open Nos. H4-287344, H3-3249, and 2002-231797).

However, when liquid silicone rubber is used for joining the susceptor to the cooling board, the susceptor suffers warping because the volume of the liquid silicone rubber shrinks by curing. As a result, the flatness of the susceptor may decrease. Alternatively, when an In-containing metal layer is used, a process for manufacturing a semiconductor device may be contaminated with In. On the other hand, when an organic adhesive agent is used, the heat resistance of the composite is poor since the heat resisting temperature of the organic adhesive agent is as low as about 100° C.

SUMMARY OF THE INVENTION

The present invention has been achieved in order to solve the above problems, and therefore an object of the present invention is to provide a heat resistant bonding material capable of maintaining high flatness of a susceptor for a semiconductor manufacturing device and causing no contamination of a manufacturing process.

Another object of the present invention is to provide a heat resistant semiconductor supporting device having a bonding material, which is provided between a susceptor for a semiconductor manufacturing derive and a cooling board, capable of maintaining the high flatness of the susceptor, and causes no contamination of a manufacturing process.

To solve the above problems, a semiconductor supporting device according to the present invention comprises a susceptor for a semiconductor manufacturing device, a cooling board, and a bonding material for joining the susceptor and the cooling board. The bonding material is formed of a cured sheet composed of an addition curable silicone adhesive agent. The addition curable silicone adhesive agent contains an organopolysiloxane containing two or more vinyl groups per one molecule; an organopolysiloxane resin containing a unit (hereinafter, "M") represented by $R_3SiO_{1/2}$ (R is a monovalent hydrocarbon group having 1 to 6 carbon atoms and containing no aliphatic unsaturated bond) and a unit (hereinafter, "Q") represented by $SiO_{4/2}$ in a molar ratio (M/Q ratio) of equal to or more than 0.6 to equal to or less than 1.6; an organohydrogenpolysiloxane containing a silicon atom-bonding hydrogen atom; a platinum catalyst; and a heat conductive filler whose content falls within the range equal to or more than 20 to equal to or less than 50 vol %.

When the M/Q ratio is less than 0.6, the heat resistance of the bonding material improves, whereas its adhesiveness is likely to decrease. Also, when the M/Q ratio exceeds 1.6, the adhesiveness of the bonding material is likely to decrease. On the other hand, when the content of the heat conductive filler is less than 20 vol % relative to the whole composition, the heat conductivity of the bonding material becomes insufficient. Conversely, when the content exceeds 50 vol %, the adhesiveness of the bonding material decreases.

BRIEF DESCRIPTION OF THE DRAWINGS

Exemplary embodiments of the invention will become more fully apparent from the following description and appended claims, taken in conjunction with the accompanying drawings understanding that these drawings depict only exemplary embodiments and are, therefore, not to be considered limiting of the invention's scope, the exemplary embodiments of the invention will be described with additional specificity and detail through use of the accompanying drawings in which:

FIG. 3 shows a result of shearing separation test;

FIG. 4 shows a result of deterioration test of heat conductivity with heat; and

DETAILED DESCRIPTION OF THE INVENTION

A bonding material according to the present invention is formed of a cured sheet composed of an addition curable silicone adhesive agent. The addition curable silicone adhesive agent contains an organopolysiloxane containing two or more vinyl groups per one molecule; an organopolysiloxane resin containing a unit (hereinafter, "M") represented by $R_3SiO_{1/2}$ (R is a monovalent hydrocarbon group having 1 to 6 carbon atoms and containing no aliphatic unsaturated bond) and a unit (hereinafter, "Q") represented by $SiO_{4/2}$ in a molar ratio (M/Q ratio) equal to or more than 0.6 to equal to or less than 1.6; an organohydrogenpolysiloxane containing a silicon atom-bonding hydrogen atom; a platinum catalyst; and a heat conductive filler whose content falls within the range equal to or more than 20 vol % to equal to or less than 50 vol %.

The addition curable silicone adhesive agent composition preferably contains:

(A) an organopolysiloxane having two or more vinyl groups per molecule;

(B) an organopolysiloxane resin containing an $R_3SiO_{1/2}$ unit ((R is a monovalent hydrocarbon group having 1 to 6 carbon atoms and containing no aliphatic unsaturated bond) and an $SiO_{4/2}$ unit in a molar ratio of 0.6 to 1.6;

(C) an organohydrogenpolysiloxane having three or more SiH groups per molecule;

(D) a platinum catalyst; and (E) a heat conductive filler.

The content of vinyl groups in a component (A) is preferably 0.02 to 0.40 mol %, and more preferably, 0.04 to 0.25 mol %. When the content of vinyl groups is equal to or less than 0.02 mol %, the adhesive force and holding power decrease. When the content is equal to or more than 0.04 mol %, the adhesive force and tackiness decrease.

The component (A) may be a chain-like organopolysiloxane containing a vinyl group at the end of the molecular chain or a side chain. The component (A) may be in an oily state or crude rubber. The viscosity of the component (A) at 25° C. is preferably equal to or more than 1000 mPa·s, and particularly, equal to or more than 10000 mPa·s. The upper limit of the viscosity is not particularly limited; however, it is preferable to set the upper limit such that a polymerization degree becomes equal to or less than 20,000. The substances of the component (A) may be used singly or in a combination of two or more types.

The component (B) is an organopolysiloxane containing an $R_3SiO_{1/2}$ unit ((R is a monovalent hydrocarbon group having 1 to 6 carbon atoms and containing no aliphatic unsaturated bond) and an $SiO_{4/2}$ unit in a molar ratio (M/Q ratio) of 0.6 to 1.6, preferably 0.8 to 1.5, and further preferably 1.0 to 1.5. When the molar ratio of the $R_3SiO_{1/2}$ unit to the $SiO_{4/2}$ unit is less than 0.6, adhesive force and tackiness may decrease. On the other hand, when the molar ratio exceeds 1.6, adhesive force and tackiness may decrease. The component (B) may contain an SiOH group. The content of the SiOH group may be 0 to 4.0 wt %. Two or more types of substances may be used as the components (B). Note that examples of R include alkyl groups such as a methyl group, ethyl group, propyl group, butyl group, cycloalkyl groups such as cyclohexyl group, and a phenyl group. Among them, a methyl group is preferable.

The mass ratio of the component (A) to the component (B) is 80:20 to 20:80 and preferably 60:40 to 30:70. When the content of the component (A) is excessively low, tackiness decreases. Conversely, when the content of the component (A) is excessively large, adhesive force decreases. Due to these disadvantages, both cases are not preferable.

In particular, in view of adhesiveness and detachability, the molar ratio of the $R_3SiO_{1/2}$ unit to the $SiO_{4/2}$ unit of the component (B) is preferably from 1.0 to 1.5. More preferably, besides this, the molar ratio of the component (A) to the component (B) is 50:50 to 40:60.

The component (C) is a crosslinking agent. Use can be made of a linear, branched, and cyclic organohydropolysiloxane having at least three and preferably four SiH groups per molecule.

The component (C) is preferably added so as to satisfy the conditions where the molar ratio of the SiH groups contained in the component (C) relative to the vinyl groups contained in the component (A) falls in the range of 1 to 25, and particularly, 5 to 20. When the ratio is less than 1, the crosslinking density is low; with the result that holding power decreases. When the ratio exceeds 25, adhesive force and tackiness decrease. In this case, when an adhesive sheet is formed by applying an adhesive agent composition, the application available time of the composition is shortened.

The component (D) is a platinum catalyst. Examples of the platinum catalyst include platinum chloride, an alcohol solution of platinum chloride, a reaction product between platinum chloride and an alcohol, a reaction product between platinum chloride and an olefin compound, and a reaction product between platinum chloride and a vinyl group-containing siloxane. Among them, use is preferably made of a reaction product between platinum chloride and a vinyl group containing siloxane, which is available under a trade name of CAT-PL-50T (manufactured by Shin-Etsu Chemical Co., Ltd.).

The addition amount of the component (D) is preferably 5 to 500 ppm in terms of platinum relative to the total amount (100 parts by mass) of the component (A) and (B), in particular, 10 to 200 ppm. When the addition amount is less than 5 ppm, harden ability, crosslinking density and holding power may decrease. When the addition amount exceeds 500 ppm, the application available time of an adhesive agent composition may decrease.

The component (E) is a heat conductive filler, which is desirably formed of any one of aluminum oxide ($Al_2O_3$), aluminum nitride (AlN) and silicon carbide (SiC).

The heat conductive filler is desirably formed by adding fine particles having an average particle size equal to or less than 1 μm and coarse particles having an average particle size within the numerical range equal to or more than 10 μm to equal to or less than 30 μm in the weight ratio equal to or more than 3:7 to equal to or less than 1:9. By virtue of this, the spaces between the coarse particles are filled with the fine particles and heat conductivity is stabilized. Furthermore, since the spaces are tightly filled with the fine particles, the adhesion between a susceptor for a semiconductor manufacturing device and a cooling board can be improved while maintaining low elasticity of a bonding material. Note that when the average particle size of the heat conductive filler exceeds 30 μm, the surface smoothness of the bonding material decreases, with the result that adhesiveness is likely to decrease.

It is preferable that a silane coupling primer is applied to the bonding surfaces between the bonding material and a susceptor for a semiconductor manufacturing device and between the bonding material and a cooling board. The susceptor is desirably formed of any one of aluminum nitride, aluminum oxide, boron nitride (BN), and yttria. The cooling board is desirably formed of either one of aluminum alloy and brass.

When necessary, an addition-reaction controlling agent can be added as a component (F). The component (F) is added in preparing or applying a silicone adhesive agent composition in order to prevent thickening and gelatinization of the adhesive agent composition before hardened with heat.

Specific examples of the component (F) include 3-methyl-1-butyne-3-ol, 3-methyl-1-pentyne-3-ol, 3,5-dimethyl-1-hexine-3-ol, 1-ethynylcyclohexanol, 3-methyl-3-trimethylsiloxy-1-butyne, 3-methyl-3-trimethylsiloxy-1-pentyne, 3,5-dimethyl-3-trimethylsiloxy-1-hexine, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane, and 1,1,3,3-tetramethyl-1,3-divinyldisiloxane.

The content of the component (F) preferably falls within the range of 0 to 8.0 parts by mass relative to the total amount (100 parts by mass) of the components (A) and (B), in particular, 0.05 to 2.0 parts by mass. When the content exceeds 8.0 parts by mass, the harden ability may decrease.

To a silicone adhesive agent composition according to the present invention, any optional component other than the above components can be added. Examples of the optional component include nonreactive organopolysiloxanes such as dimethylpolysiloxane, dimethyldiphenypolylsiloxane; aromatic solvents such as toluene and xylene, aliphatic solvents such as hexane, octane and isoparaffin, ketone based solvents such as methylethylketone and methylisobutylketone, ester based solvents such as ethyl acetate and isobutyl acetate, ether based solvents such as diisopropylether and 1,4-dioxane, and solvent mixtures of these, serving as a viscosity reducing agent when the adhesive agent is applied; antioxidants, dyes and pigments. Note that a solvent is used for reducing the viscosity of an adhesive-agent composition and rendering application of the composition easier.

The amount of the silicone adhesive agent composition to be applied can be selected such that the thickness of the adhesive layer hardened falls within the range of 50 to 300 μm preferably 100 to 200 μm.

An addition curable adhesive agent may be cured at a temperature of 90° C. to 120° C. for 5 to 20 minutes; however, the curing conditions are not limited to these.

Figure 1:
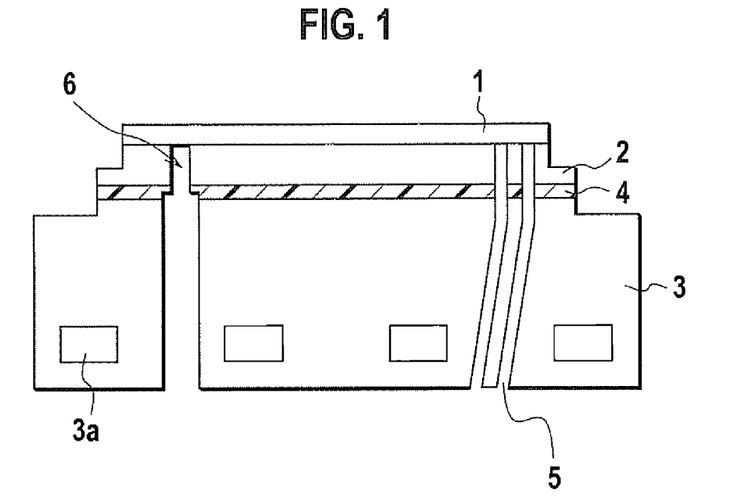
FIG. 1 is a schematic diagram showing a configuration of a semiconductor supporting device according to an embodiment of the present invention.

The bonding material according to the present invention can be used in a semiconductor supporting device (for example, as shown in FIG. 1) having a susceptor 2 for a semiconductor manufacturing device for supporting a semiconductor wafer 1 and a cooling board 3 for controlling the temperature of the semiconductor wafer 1 by cooling the susceptor 2 with a cooling medium supplied to a cooling medium supply channel 3a. More specifically, the bonding material can be used as a bonding material 4 for joining the susceptor 2 to the cooling board 3. Note that the semiconductor supporting device shown in FIG. 1 further has gas channels 5 for supplying gas between the semiconductor wafer 1 and the susceptor 2, and a lift pin hole 6 for removing the semiconductor wafer 1 from the susceptor 2 by inserting a lift pin. They are formed so as to pass through the susceptor 2, cooling board 3 and bonding material 4.

Best modes for carrying out the present invention are explained below.

Example 1

In Example 1, first a mixture was prepared by adding 100 parts by mass of an organopolysiloxane containing a vinyl group at both ends of the molecular chain; 180 parts by mass of an organopolysiloxane resin containing a unit (hereinafter, "M") represented by $R_3SiO_{1/2}$ (R is a monovalent hydrocarbon group having 1 to 6 carbon atoms and containing no aliphatic unsaturated bond) and a unit (hereinafter, "Q") represented by $SiO_{4/2}$ in a molar ratio (M/Q ratio) of 1.1; an organohydrogenpolysiloxane containing a silicon atom-bonding hydrogen atom in an amount providing a molar ratio of the SiH group (contained in the organohydrogenpolysiloxane) is 15 relative to a vinyl group contained in the organopolysiloxane containing the vinyl group; a platinum catalyst; and 20 vol % of a heat conductive filler formed of fine aluminum oxide particles having an average particle size of 0.7 μm and coarse aluminum oxide particles having an average particle size of 20 μm in a weight ratio of 10:90 in mixture. Then, the mixture thus prepared was dissolved in toluene to prepare an addition curable silicone adhesive agent. The adhesive agent was applied to a PET mold-release film and hardened in a hot-air circulating dryer of 100° C. for 10 minutes. The cured product was removed from the PET mold-release film to obtain a bonding material of 120 μm thick according to Example 1. The bonding material was interposed between an aluminum (Al) square board and an aluminum nitride (AlN) square board and joined at a temperature of 100° C. and a pressure of 1.4 MPa for 10 minutes. In this manner, a composite according to Example 1 was obtained.

Example 2

A composite according to Example 2 was obtained by manufacturing it in the same conditions as in Example 1 except that a silane coupling primer was previously applied to the joining surfaces of Al and AlN.

Example 3

A composite according to Example 3 was obtained by manufacturing it in the same conditions as in Example 1 except that the weight ratio of the fine particles to the coarse particles was set at 30:70.

Example 4

A composite according to Example 4 was obtained by manufacturing it in the same conditions as in Example 1 except that the weight ratio of the fine particles to the coarse particles was set at 20:80.

Example 5

A composite according to Example 5 was obtained by manufacturing it in the same conditions as in Example 1 except that the content of the heat conductive filler was set at 33 vol %.

Example 6

A composite according to Example 6 was obtained by manufacturing it in the same conditions as in Example 5 except that the weight ratio of the fine particles to the coarse particles was set at 20:80.

Example 7

A composite according to Example 7 was obtained by manufacturing it in the same conditions as in Example 6 except that a silane coupling primer was previously applied to the joining surfaces of Al and AlN.

Example 8

A composite according to Example 8 was obtained by manufacturing it in the same conditions as in Example 6 except that the M/Q ratio was set at 1.5.

Example 9

A composite according to Example 9 was obtained by manufacturing it in the same conditions as in Example 8 except that a silane coupling primer was previously applied to the joining surfaces of Al and N.

Example 10

A composite according to Example 10 was obtained by manufacturing it in the same conditions as in Example 7 except that the M/Q ratio was set at 0.6.

Example 11

A composite according to Example 11 was obtained by manufacturing it in the same conditions as in Example 7 except that the average particle size of the coarse particles was set at 10 μm.

Example 12

A composite according to Example 12 was obtained by manufacturing it in the same conditions as in Example 7 except that the average particle size of the coarse particles was set at 30 µm.

Example 13

A composite according to Example 13 was obtained by manufacturing it in the same conditions as in Example 7 except that the content of the heat conductive filler was set at 50 vol %.

Example 14

A composite according to Example 14 was obtained by manufacturing it in the same conditions as in Example 7 except that aluminum nitride (AlN) was used as the heat conductive filler.

Example 15

A composite according to Example 15 was obtained by manufacturing it in the same conditions as in Example 7 except that silicon carbide (SiC) was used as the heat conductive filler.

Comparative Example 1

An acrylic resin containing a heat conductive filler having an average particle size of 10 µm in an amount of 30 vol % was used for joining Al and AlN to obtain a composite according to Comparative example 1.

Comparative Example 2

A composite according to Comparative example 2 was obtained by manufacturing it in the same conditions as in Example 6 except that the M/Q ratio was set at 0.4.

Comparative Example 3

A composite according to Comparative example 3 was obtained by manufacturing it in the same conditions as in Example 6 except that the M/Q ratio was set at 1.7.

Comparative Example 4

A composite according to Comparative example 4 was obtained by manufacturing it in the same conditions as in Example 6 except that the content of the heat conductive filler was set at 60 vol %.

Comparative Example 5

A composite according to Comparative example 5 was obtained by manufacturing it in the same conditions as in Example 7 except that the weight ratio of the fine particles to the coarse particles was set at 5:95.

Comparative Example 6

A composite according to Comparative example 6 was obtained by manufacturing it in the same conditions as in Example 7 except that the average particles size of the coarse particles was set at 40 µm.

Comparative Example 7

A composite according to Comparative example 7 was obtained by manufacturing it in the same conditions as in Comparative example 4 except that aluminum nitride (AlN) was used as the heat conductive filler.

Comparative Example 8

A composite according to Comparative example 8 was obtained by manufacturing it in the same conditions as in Comparative example 4 except that silicon carbide (SiC) was used as the heat conductive filler.

Comparative Example 9

A composite according to Comparative example 9 was obtained by manufacturing it in the same conditions as in Example 7 except that the content of the heat conductive filler was set at 15 vol %.

Comparative Example 10

A composite according to Comparative example 10 was obtained by manufacturing it in the same conditions as in Comparative example 9 except that aluminum nitride (AlN) was used as the heat conductive filler.

Comparative Example 11

A composite according to Comparative example 11 was obtained by manufacturing it in the same conditions as in Comparative example 9 except that silicon carbide (SiC) was used as the heat conductive filler.

[Shearing Separation Test]

Figure 2:
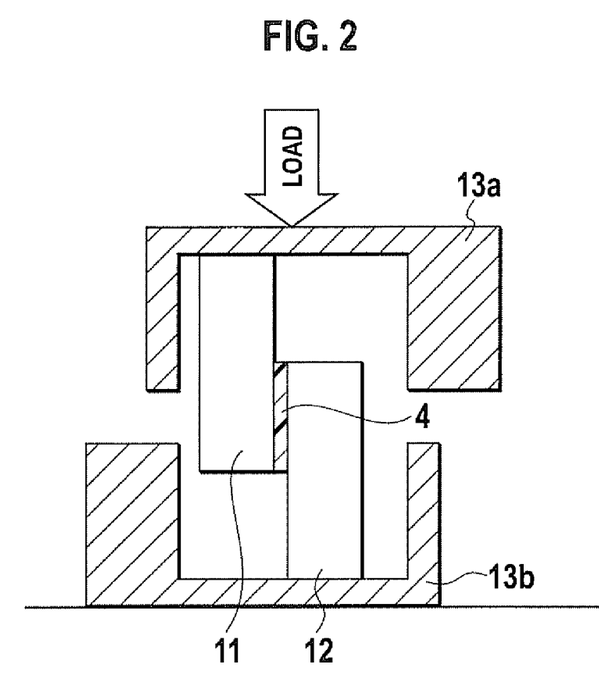
FIG. 2 is a schematic diagram showing a shearing separation tester according to the embodiment.

A cut piece of 25×25 mm of each of bonding material of Examples 1 to 15 and Comparative examples 1 to 8 was interposed between an AlN square board 11 and an Al square board 12 of 25 mm (width)×35 mm (length)×10 mm (thickness). The boards were joined at a temperature of 100° C. and a pressure of 14 atom to obtain a composite. The composite was tested for shearing separation strength and shearing elongation by use of a shearing separation tester as shown in FIG. 2 with 13a and 13b at room temperature and 150° C. The results are shown in FIG. 3. Note that, the shearing separation strength for maintaining air-tightness of the bonded interface in the case of a composite of ϕ300 mm for practical use is empirically known to be equal to or more than 0.5 Mpa at room temperature and equal to or more than 0.2 Mpa at 150° C. The shearing elongation is known to be equal to or more than 0.04 at both room temperature and 150° C. These values were used as desired values.

As is apparent from FIG. 3, the composites of Examples 1 to 15 were superior in shearing separation strength and shearing elongation to the composites of Comparative examples 1 to 8. More specifically, in the composite of Comparative example 1, since the bonding material was formed of a low heat resistant acrylic resin, the shearing separation strength sharply decreased as the temperature increased. In the composite of Comparative example 2, since the adhesiveness of the bonding material was poor due to low M/Q ratio, the shearing separation strength was low. In the composite of Comparative example 3, since it was too soft although the adhesiveness of the bonding material was high due to high M/Q ratio, the shearing separation strength was low. In the composite of Comparative example 4, since the adhesiveness of the bonding material was poor due to high content of the heat conductive filler, the shearing separation strength was low. In the composite of Comparative example 5, since the adhesiveness of the bonding material was poor due to the excessively small content of fine particles constituting the heat conductive filler, the shearing separation strength was low. In the composite of Comparative example 6, since the adhesiveness of the bonding material was poor due to the excessively large average particle size of coarse particles constituting the heat conductive filler, the shearing separation strength was low. In the composites of Comparative examples 7 and 8, since the adhesiveness of the bonding material was poor due to an excessively large content of the heat conductive filler, the shearing separation strength was low.

[Deterioration Test of Heat Conductivity with Heat]

A cut piece of 25×25 mm of each of the bonding materials according to Examples 1, and 5 to 9 and Comparative examples 1, 4, 7 to 11 was interposed between an AlN disk board (φ10×t1 mm) and an Al disk board (φ10×t2 mm). The boards were joined at a temperature of 100° C. and a pressure of 14 atom to form a composite. The composite was subjected to an endurance test by maintaining it under the conditions of a temperature of 150° C. for 500 hours. Thereafter, the heat conductivity of each of the composites was determined by a laser flash method to obtain deterioration of heat conductivity with heat. The known heat conductivity values of AlN (90 W/mK) and Al (160 W/mK) were subtracted from the measured heat conductivity value of the whole composite to obtain the heat conductivity of a bonding material alone; however, the obtained value included an influence of the heat resistance of the bonded interface. The measurement results are shown in FIG. 4. A desired heat conductivity is equal to or less than 0.30 W/mK.

In the composites of Comparative examples 1, 4, and 7 to 11, the heat conductivity of a bonding material decreased after the endurance test. In contrast, in the composites of Examples 1, 5 to 9, and 11 to 15, no decrease in heat conductivity of a bonding material was observed before and after the endurance test. This is conceivably because the adhesiveness of a bonding material is sufficient since the bonding material of each of the composites of Examples 1, 5 to 9, and 11 to 15 is basically formed of a heat resistant silicone resin, and the M/Q ratio and the content of the heat conductive filler are appropriate. On the other hand, in the composites of Comparative examples 1, 4, and 7 to 11, the heat conductivity of a bonding material decreases after the endurance test for the reasons set forth below. In the composite of Comparative example 1, the bonding material is formed of low heat resistant acrylic resin. In Comparative example 2, the adhesiveness is poor due to low M/Q ratio of the bonding material. In Comparative example 3, the adhesiveness is high due to high M/Q ratio of the bonding material. In the composites of Comparative examples 4, 7 and 8, the adhesiveness of the bonding material is poor due to high content of a heat conductive filler. In the composites of Comparative examples 9 to 11, the adhesiveness of the bonding material is poor, because the content of a heat conductive filler is too small.

[Thermal Cycle Test]

Figure 5:
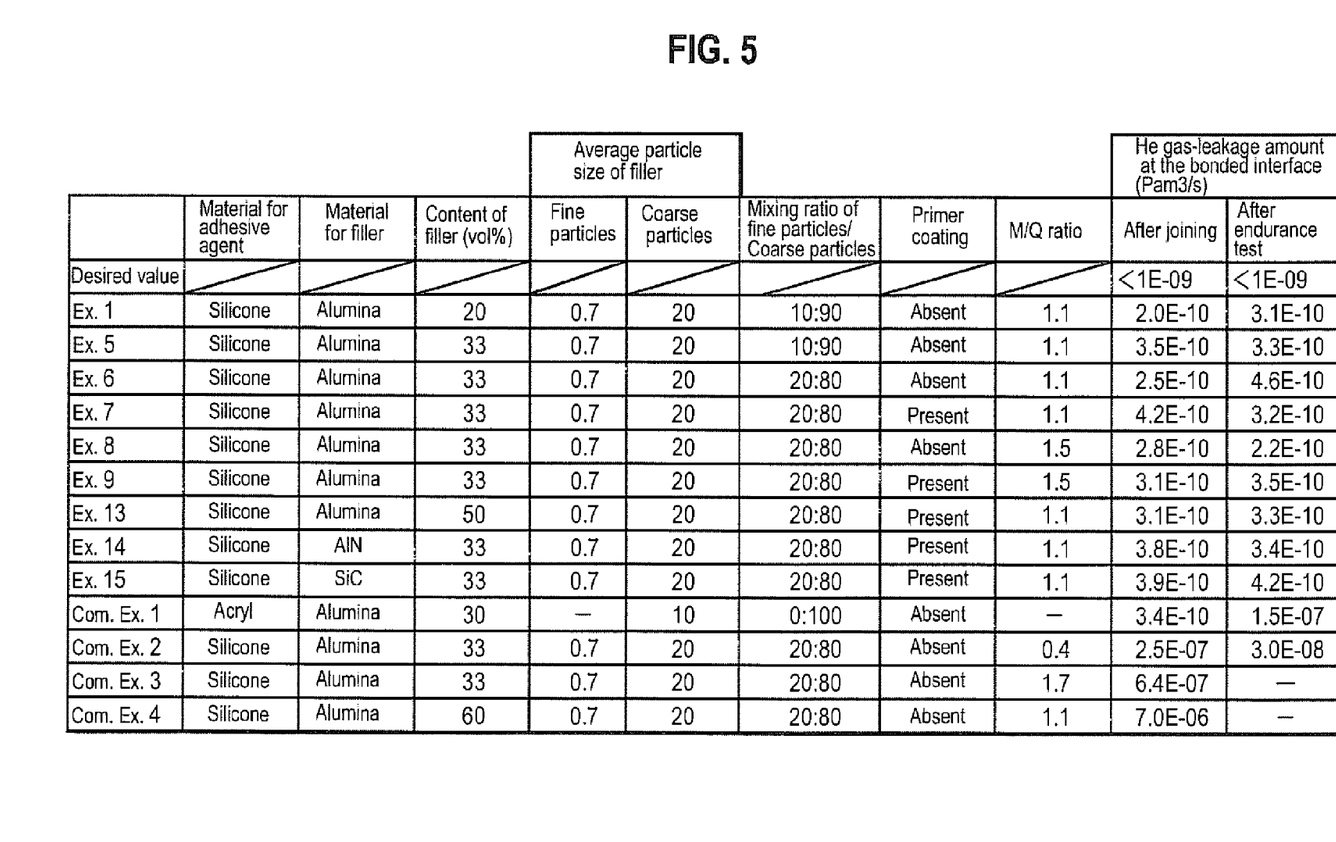
FIG. 5 shows a result of thermal cycle test.

The bonding materials of Examples 1, 5 to 9 and 13 to 15 and Comparative examples 1 to 4 were selected as representative examples based on the results of the shearing separation test. Each of the bonding material was sandwiched between a susceptor formed of AlN for a semiconductor manufacturing device and a cooling board formed of Al, and a laminate was joined at a temperature of 100° C. and a pressure of 14 atom. Thereafter, the resultant composite was subjected to an endurance test, which was performed by increasing the temperature from 30° C. to 150° C. and then decreasing to 30° C. After this operation was repeatedly performed 30 cycles, the flatness of the composite and gas leakage at the bonded interface were evaluated. The sizes of the susceptor and the cooling board were φ300×t10 mm and φ300×t30 mm, respectively. Evaluation of gas leakage was performed by spraying He supplied from the gas channel passing through the cooling board onto the joint portion while blocking the gas channel passing through the susceptor, and measuring the leakage amount of He by a He leak detector. The results are shown in FIG. 5. When a susceptor was bonded to a cooling board with the bonding material according any one of Examples 1, 5 to 9 and 13 to 15, no gas leakage was detected not only after joining but also after the endurance test. In contrast, when the susceptor was bonded to a cooling board with the bonding material agent according any one of Comparative examples 1 to 4, gas leakage was detected after the endurance test was performed 30 cycles. The flatness of the composite according to any one of Examples 1, 5 to 9 and 13 to 15 and Comparative examples 1 to 4 fell within 30 μm or less, raising no problem from a practical point of view.

According to the present invention, it is possible to provide a heat resistant bonding material capable of maintaining the high flatness of a susceptor for a semiconductor manufacturing device and causing no contamination of a manufacturing process. Furthermore, according to the present invention, it is possible to provide a heat resistant semiconductor supporting device having a bonding material, which is provided between a susceptor for a semiconductor manufacturing derive and a cooling board, capable of maintaining the high flatness of the susceptor, and causes no contamination of a manufacturing process.

Description has been made of the embodiments to which the invention created by the inventors of the present invention is applied. However, the present invention is not limited to the descriptions and the drawings, which form a part of the disclosure of the present invention according to these embodiments. Specifically, all of other embodiments, examples, operational techniques and the like, which are made by those skilled in the art based on these embodiments, are naturally incorporated in the scope of the present invention. The above is additionally described at the end of this specification.

What is claimed is:

1. A semiconductor supporting device comprising:
   a susceptor for a semiconductor manufacturing device;
   a cooling board;
   a single layer of bonding material that joins the susceptor to the cooling board; and
   a silane coupling primer layer only on bonded interfaces between the bonding material and the susceptor and between the bonding material and the cooling board;
   wherein the single layer of bonding material directly contacts the silane primer layers, which in turn directly contact the susceptor and the cooling board, respectively, and
   wherein the bonding material is formed of a cured sheet consisting essentially of an addition curable silicone adhesive agent comprising an organopolysiloxane containing two or more vinyl groups per molecule, an organopolysiloxane resin containing a unit (hereinafter, "M") represented by $R_3SiO_{1/2}$ (R is a monovalent hydrocarbon group having 1 to 6 carbon atoms and containing no aliphatic unsaturated bond) and a unit (hereinafter, "Q") represented by $SiO_{4/2}$ in a molar ratio (M/Q ratio) equal to or more than 0.6 to equal to or less than 1.6, an organohydrogenpolysiloxane containing a silicon atom-bonding hydrogen atom, a platinum catalyst, and a heat conductive filler whose content falls within a range of 20 vol % or more to 50 vol % or less.

2. The semiconductor supporting device according to claim 1, wherein the heat conductive filler is formed of any one of aluminum oxide, aluminum nitride and silicon carbide.

3. The semiconductor supporting device according to claim 1, wherein the heat conductive filler is formed by adding fine particles having an average particle size equal to or less than 1 μm and coarse particles having an average particle size equal to or more than 10 μm to equal to or less than 30 μm in a weight ratio equal to or more than 3:7 to equal to or less than 1:9.

4. The semiconductor supporting device according to claim 1, wherein the susceptor is formed of any one of aluminum nitride, aluminum oxide, boron nitride, and yttria, and the cooling board is formed of either one of aluminum alloy and brass.

\* \* \* \* \*

UNITED STATES PATENT AND TRADEMARK OFFICE
CERTIFICATE OF CORRECTION

Page 1 of 1

PATENT NO. : 9,631,128 B2
APPLICATION NO. : 12/025903
DATED : April 25, 2017
INVENTOR(S) : Tomoyuki Fujii and Akio Suzuki It is certified that error appears in the above-identified patent and that said Letters Patent is hereby corrected as shown below:

On the Title Page

Item (56), Foreign Patent Documents, Page 2:
Please change: "TW 1250198 3/2006" to -- TW I250198 3/2006 --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*